US007859386B2

(12) United States Patent
Lundkvist

(10) Patent No.: US 7,859,386 B2
(45) Date of Patent: Dec. 28, 2010

(54) METHOD FOR CONTROLLING AUTHORIZATION TO AN OBJECT AND A COMPUTER PROGRAM PRODUCT FOR THE AUTHORIZATION CONTROL

(75) Inventor: Ola Lundkvist, Gothenburg (SE)

(73) Assignee: Volvo Technology Corporation, Gothenburg (SE)

( * ) Notice: Subject to any disclaimer, the term of this patent is extended or adjusted under 35 U.S.C. 154(b) by 39 days.

(21) Appl. No.: 10/249,611

(22) Filed: Apr. 23, 2003

(65) Prior Publication Data

US 2003/0184431 A1 Oct. 2, 2003

Related U.S. Application Data

(63) Continuation of application No. PCT/SE01/02321, filed on Oct. 23, 2001, now abandoned.

(30) Foreign Application Priority Data

Oct. 23, 2000 (SE) .................................... 0003833

(51) Int. Cl.
*H04Q 9/00* (2006.01)

(52) U.S. Cl. ....................... 340/5.27; 340/10.1; 340/5.6

(58) Field of Classification Search ................ 340/5.27, 340/5.1, 5.2, 5.21, 5.8, 825.69, 825.72, 5.64, 340/5.61, 5.6, 10.1; 307/10.1
See application file for complete search history.

(56) References Cited

U.S. PATENT DOCUMENTS

| | | | | |
|---|---|---|---|---|
| 3,503,680 | A | 3/1970 | Schenkerman | 356/5.08 |
| 4,596,985 | A | 6/1986 | Bongard et al. | 340/825.69 |
| 4,688,036 | A * | 8/1987 | Hirano et al. | 340/5.62 |
| 5,293,160 | A * | 3/1994 | Kurozu et al. | 340/5.3 |
| 5,723,911 | A * | 3/1998 | Glehr | 340/10.5 |
| 5,940,007 | A * | 8/1999 | Brinkmeyer et al. | 340/825.69 |
| 6,208,239 | B1 * | 3/2001 | Muller et al. | 340/426.35 |
| 6,346,878 | B1 * | 2/2002 | Pohlman et al. | 340/435 |
| 6,617,961 | B1 * | 9/2003 | Janssen et al. | 340/5.8 |

FOREIGN PATENT DOCUMENTS

| | | | | |
|---|---|---|---|---|
| DE | 19854128 | A1 | | 5/2000 |
| DE | 19846803 | C1 | | 9/2000 |
| EP | 0098160 | | * | 11/1984 |
| EP | 0773148 | A1 | | 5/1997 |
| EP | 0870889 | | * | 10/1998 |
| WO | WO 9967486 | A1 | | 12/1999 |
| WO | WO 0012848 | A1 | | 3/2000 |

* cited by examiner

*Primary Examiner*—Vernal U Brown
(74) *Attorney, Agent, or Firm*—Novak Druce + Quigg, LLP

(57) ABSTRACT

Method and arrangement for controlling authorization for access to an object, in which a signal communication via electromagnetic waves is established between the object and a wireless portable unit when a tripping device on the object is actuated. The signal communication includes at least one first signal (X1 . . . Xn) that is sent from the object to the portable unit, and at least one second signal (Y3, Z1 . . . Zn) that is sent from the portable unit to the object in response to the first signal(s). The second signal(s) includes sufficient information for verifying that the portable unit has an approved identity. The verification information is checked, a distance is measured between the object and the portable unit and the authorization is confirmed if both the checked verification information is approved and the measured distance is less than a predetermined value. For the distance measurement, a time (T3) is measured for the transmission of at least one of the first signals and at least one of the second signals with verification information.

31 Claims, 5 Drawing Sheets

METHOD FOR CONTROLLING AUTHORIZATION TO AN OBJECT AND A COMPUTER PROGRAM PRODUCT FOR THE AUTHORIZATION CONTROL

CROSS REFERENCE TO RELATED APPLICATIONS

The present application is a continuation patent application of International Application No. PCT/SE01/02321 filed Oct. 23, 2001 which was published in English pursuant to Article 21(2) of the Patent Cooperation Treaty and which claims priority to Swedish Patent Application No. 0003833-1 filed Oct. 23, 2000. Both applications are expressly incorporated herein by reference in their entireties.

BACKGROUND OF INVENTION

1. Field of the Invention

The present invention relates to a method for controlling authorization for access to an object, in which a signal communication via electromagnetic waves is established between the object and a wireless portable unit when a tripping device on the object is actuated. The signal communication comprises (includes) at least a first signal that is sent from the object to the portable unit and at least a second signal that is sent from the portable unit to the object in response to the first signal(s). The second signal(s) comprises sufficient information to verify that the portable unit has an approved identity (verification information can be checked) and a distance is measured between the object and the portable unit so that authorization is confirmed if both the checked verification information is approved and the measured distance is less than a predetermined value. The predetermined value corresponds to a maximal permitted distance between the portable unit and the object.

The invention will be described below for authorization control for a vehicle, such as a car or truck. This is a preferred, but in no way limiting, application of the invention. In such a case, the tripping device normally consists of a door handle on the vehicle.

More specifically, the field of the invention is aimed at a so-called passive access control, which means that the person who is authorized to access the object does not need to actively use any key or remote control in order to unlock the object's door. Instead, the authorization is checked automatically via the abovementioned signal communication using electromagnetic waves between the vehicle and the wireless unit carried by the person, when the vehicle's door handle is actuated. The door is unlocked automatically in the event of approved authorization.

2. Background Art

U.S. Pat. No. 5,723,911 relates to a device for controlling access to a motor vehicle. This control is designed to be carried out without the user needing to actuate any key. A distance detection device on a transceiver carried by the user is designed to detect the distance between the transceiver and the vehicle with the aim of reducing the risk of unauthorized access to the vehicle. The authorization control is carried out by a transmitter in the vehicle sending a call signal to a receiver in the transceiver when the vehicle's door handle is actuated. The transmitted signal has a short range. The transceiver's receiver receives the signal and sends a coded response signal back to the vehicle only if the vehicle is in the immediate vicinity of the transceiver. In other words, no response signal is sent back to the vehicle if this is not located in the vicinity of the transceiver. A receiving unit in the vehicle receives the response signal, checks it and sends an unlocking signal to the lock if the response signal is correct. The distance detection is carried out, for example, via transmission of a distance detection signal from the transceiver and reflection of this by the vehicle.

The distance detection is carried out as mentioned above with the aim of reducing the risk of unauthorized access to the vehicle. Such unauthorized access to the vehicle has previously been possible by the use of a pair of receiver-transmitters in the following way: a first person with a first transmitter-receiver is in the vicinity of the vehicle while a second person with a second transmitter-receiver stands in the vicinity of the authorized user of the vehicle. The first person actuates the door handle of the vehicle, which initiates the signal communication. The signal (with a short range) from the vehicle's transmitter is received by the first person's receiver and forwarded with a long range to the transmitter-receiver of the second person and thereafter to the rightful user of the vehicle. In the same way, the coded signal is thereafter sent back from the portable unit to the vehicle via the two pairs of transmitters-receivers and authorization is confirmed.

Using the distance detection device according to U.S. Pat. No. 5,723,911, the time it takes for the electromagnetic waves or ultrasound waves to go from the portable unit to the object and back again is measured. If the rightful user is located at a great distance from the vehicle, the transmission of the ultrasound waves takes a long time. This is detected and a signal is not sent back to the vehicle from the portable unit.

A problem with this distance detection device is that it is not possible to know for certain that it is the correct (authorized) portable unit that is in the vicinity of the right vehicle. In addition, known methods for distance detection, such as ultrasound echoes and metal detection, are relatively easy to deceive and are thus not secure.

SUMMARY OF INVENTION

A first aim of the invention is to achieve a method for controlling authorized access to an object with increased security in relation to previous technology.

This aim is achieved by obtaining a distance measurement from a sensed time period for the transmission of at least a first and second signal containing verification information. In other words, the distance is determined between the object and the portable unit by measuring the travel time for at least part of the signal communication for accomplishing the identity verification step, and it is also ascertained that this measured period is really the time between the correct portable unit and the object. The signals for the identity control are thus used to determine whether the portable unit and the object are located sufficiently close to each other. This results in increased security.

Because the time period is measured for the signals that are used for the identity control, the distance detection method that is separate to the identity control method according to previous technology is eliminated. In other words, according to the present invention, the distance detection method is integrated into the identity control method.

An encryption system is suitably utilized for the signals. A strong encryption algorithm is preferably utilized. There are a plurality of such known encryption algorithms; for example so-called asymmetric key pairs are used, with the object holding one key and the portable unit the other key. More simple types of encryption or coding can also be used, but which will of course not provide such high security.

According to a preferred embodiment, during the part of the signal communication that is used for the time measurement, a plurality of the signals are sent in series in such a way that alternate signals consist of one of the first signals and of one of the second signals. Because the time (and thereby any time deviation) for the consecutive signals, each of which has a very short transmission time, is totaled, it is thereby possible to determine with increased certainty whether the portable unit is located within the predetermined maximal permitted distance from the vehicle.

According to a second embodiment, at least one of the first signals comprises first information that is intended to be utilized for verifying the identity of the portable unit, in which the first information is processed by the unit and in which at least one of the second signal(s) with verification information comprises a first part with the first information in processed form. The first verification information part in the last mentioned second signal consists suitably of a function of the first information. By this means, increased security is obtained with regard to whether it is the correct portable unit that has received the first signal.

According to a further development of the previous embodiment, the last mentioned second signal is sent after the conclusion of the time measurement. As the processing of the first information in the portable unit takes a certain, but not always precisely foreseeable time, the conditions are created for a time measurement with high accuracy.

According to another embodiment, which is a further development of the previous embodiment, at least one of the second signals other than the last mentioned signal comprises second verification information. To sum up, the first signal(s) thereby comprises first verification information and the second signal(s), in addition to a suitably last of these in time, comprises second verification information. By utilizing these first and second signals for the time measurement, the conditions are created for achieving a time measurement with high accuracy. The contents in the first and the second verification information are suitably independent of each other.

According to a further development of the previous embodiment, the last mentioned second signal comprises, in addition to the first verification information part, also a second part that comprises the second verification information in processed form. This results in increased security with regard to it being the correct portable unit that receives the first signals and sends the second signals.

A second aim of the invention is to achieve a specific method for the object for controlling authorization to the object with increased security in relation to previous technology. This aim is achieved by a signal communication via electromagnetic waves being established between the object and a wireless portable unit when a tripping device arranged on the object is actuated, in which the signal communication comprises at least one first signal that is sent from the object to the portable unit. At least one second signal is sent from the portable unit in response to the first signal(s), after the reception of the first signal, and that is received by the object. The second signal(s) comprises sufficient information for verifying that the portable unit has an approved identity, and in which the verification information is checked. In order to determine the distance between the object and the unit, a time is measured by the object from the transmission of one of the first signals until the reception of one of the second signals with verification information. The authorization is confirmed if both the checked verification information is approved and the measured time is less than a predetermined value.

A third aim of the invention is to achieve a specific method for a wireless portable unit for controlling authorization to an object with increased security in relation to previous technology.

This aim is achieved by a method intended to be used for controlling authorization for access to an object, in which at least one first signal, that was originally sent from the object via electromagnetic waves, is received by the portable unit, and in which a distance between the object and the portable unit is measured by the unit. At least one second signal is sent via electromagnetic waves from the portable unit to the object, in which the second signal(s) comprises sufficient information for verifying that the portable unit has approved identity, for the distance measurement, a time is measured from the transmission of one of the second signals with verification information until the reception of one of the first signals, which was sent after the reception of the second signal, and a result of the time measurement is sent to the object for confirmation of the authorization.

BRIEF DESCRIPTION OF DRAWINGS

The invention will be described in greater detail in the following, with reference to the exemplary embodiments shown in the attached drawings wherein.

DETAILED DESCRIPTION

Figure 1:
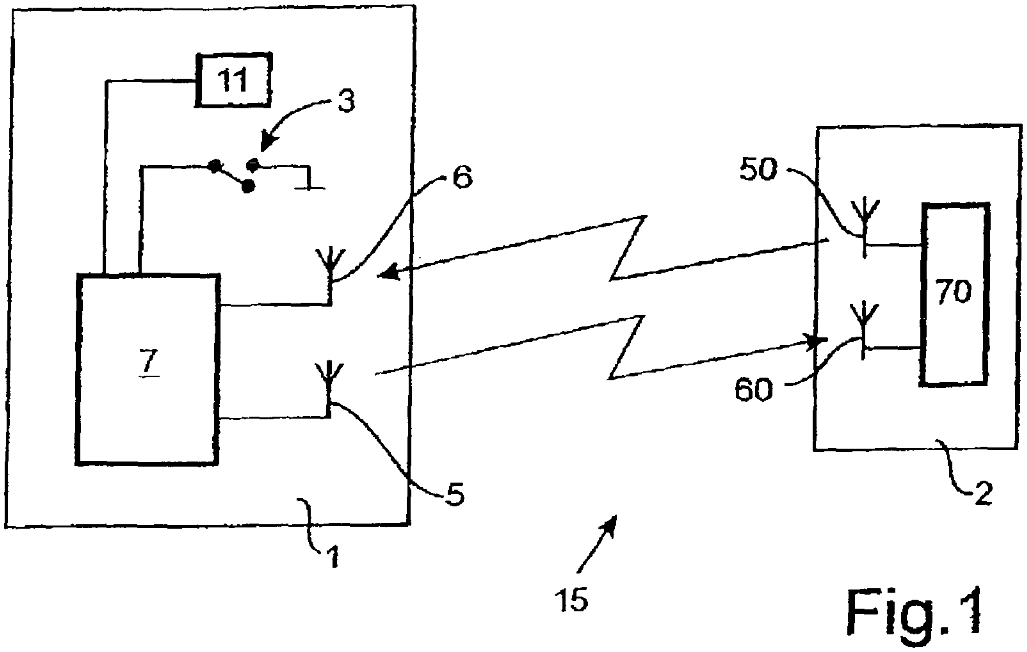
FIG. 1 is a schematic illustration of the object and the portable unit.

FIG. 1 schematically shows an authorization control device 15 comprising (including) an object 1 and a wireless portable unit 2. The invention is described herein regarding an embodiment in which the object 1 consists of a vehicle. The wireless portable unit 2 is preferably sufficiently small to be carried in the user's pocket and is suitably the shape of a card or a flat object.

The vehicle 1 comprises a tripping device 3 exemplarily in the form of a door handle. Both the vehicle 1 and the portable unit 2 comprise a transmitter 5 and 50 and a receiver 6 and 60 for signal communication via electromagnetic waves. Similarly, both the vehicle 1 and the portable unit 2 comprise a control unit 7 and 70 for controlling the signal communication.

The control unit 7 of the vehicle 1 comprises a memory, which in turn comprises a program segment, or software components, for controlling at least part of the signal communication. The control unit 7 is arranged to check information transmitted by the portable unit 2 during the signal communication, to measure the signal time and to compare the measured signal time with a predetermined value for the purpose of determining whether the vehicle 1 and the user card 2 are located sufficiently near to each other during the signal communication. Similarly, the control unit 7 of the vehicle 1 is arranged to determine at least a part of the information in the signals that are to be sent from the vehicle for the identity information control.

The vehicle comprises a lock 11 connected to the control unit 7, which lock is suitably arranged for locking/unlocking the door of the vehicle to which the door handle 3 belongs.

The control unit 70 of the portable unit is arranged to determine at least a part of the information in the signals that are to be sent from the unit for the identity control, and to control identity information sent by the object 1.

The information in all signals with identity information that are sent between the vehicle 1 and the portable unit 2 is encrypted in such a way that the information in a message transmitted by the object can only be decrypted in its entirety by the portable unit 2 and vice versa. Such an encryption method is normally called strong encryption. A so-called asymmetric key pair is used for the decryption function, the control unit of the portable unit holding one of the keys and the control unit of the object holding the other key. The key of the portable unit 2 comprises identity information for the portable unit and the key of the vehicle 1 comprises identity information for the vehicle. Alternatively, symmetric encryption can be used, which means that the vehicle and the portable unit have the same key.

The signal communication between the vehicle 1 and the portable unit 2 according to four preferred embodiments of the invention is described below with reference to FIGS. 2-5.

Figure 2:
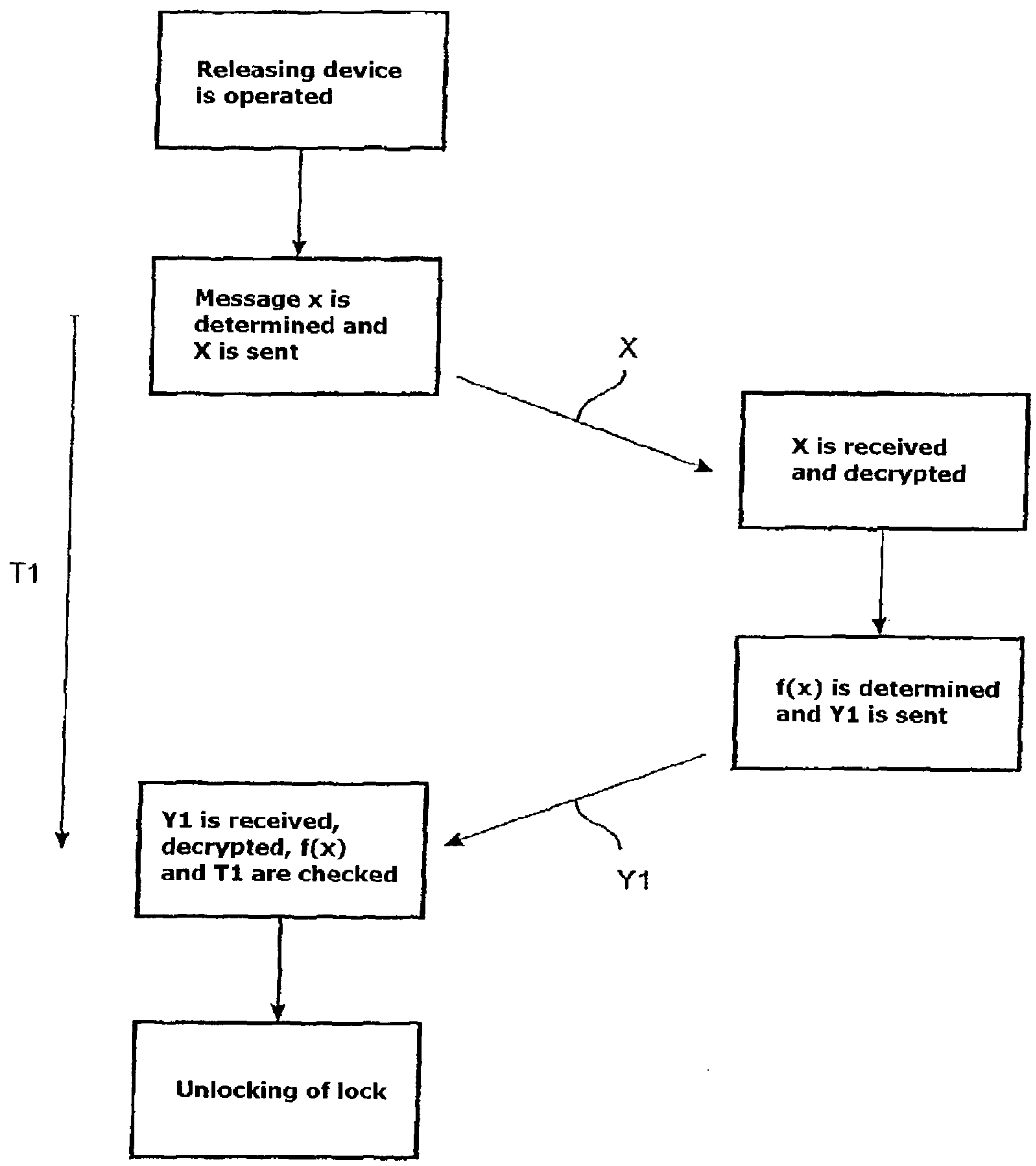
FIGS. 2-5 are block diagrams illustrating the signal communications between the object and the portable unit according to four illustrated exemplary embodiments of the invention.

FIG. 2 illustrates a first embodiment of the signaling method between the vehicle 1 and the portable unit 2. Signal communication, via electromagnetic waves, is established between the vehicle 1 and the portable unit 2 when the door handle 3 is actuated. The control unit 7 of the object 1 then creates a message that comprises first information x that is intended to be utilized for verifying the identity of the portable unit. The first information x consists of identity information O_ID unique to the object and a random number O_RND generated by the control unit 7. The message is encrypted and sent to the portable unit 2 in a first signal X.

The portable unit 2 receives the first signal X and decrypts the message. The portable unit 2 processes the first information x and sends a second encrypted signal Y1 to the object 1. The second signal Y1 comprises the first information x in processed form, more specifically a function f(x) of the first information x. In particular, f(x) comprises the message part E_SVAR=f(O_RND). The signal Y1 is received by the object 1 and the message is decrypted. A time T1 is measured by the control unit 7 of the object 1 from the transmission of the first signal X until the reception of the second signal Y1. E_SVAR and T1 are checked by the object 1, after which the lock 11 is unlocked if E_SVAR=f (O_RND) and the measured time is less than a predetermined value.

Figure 3:
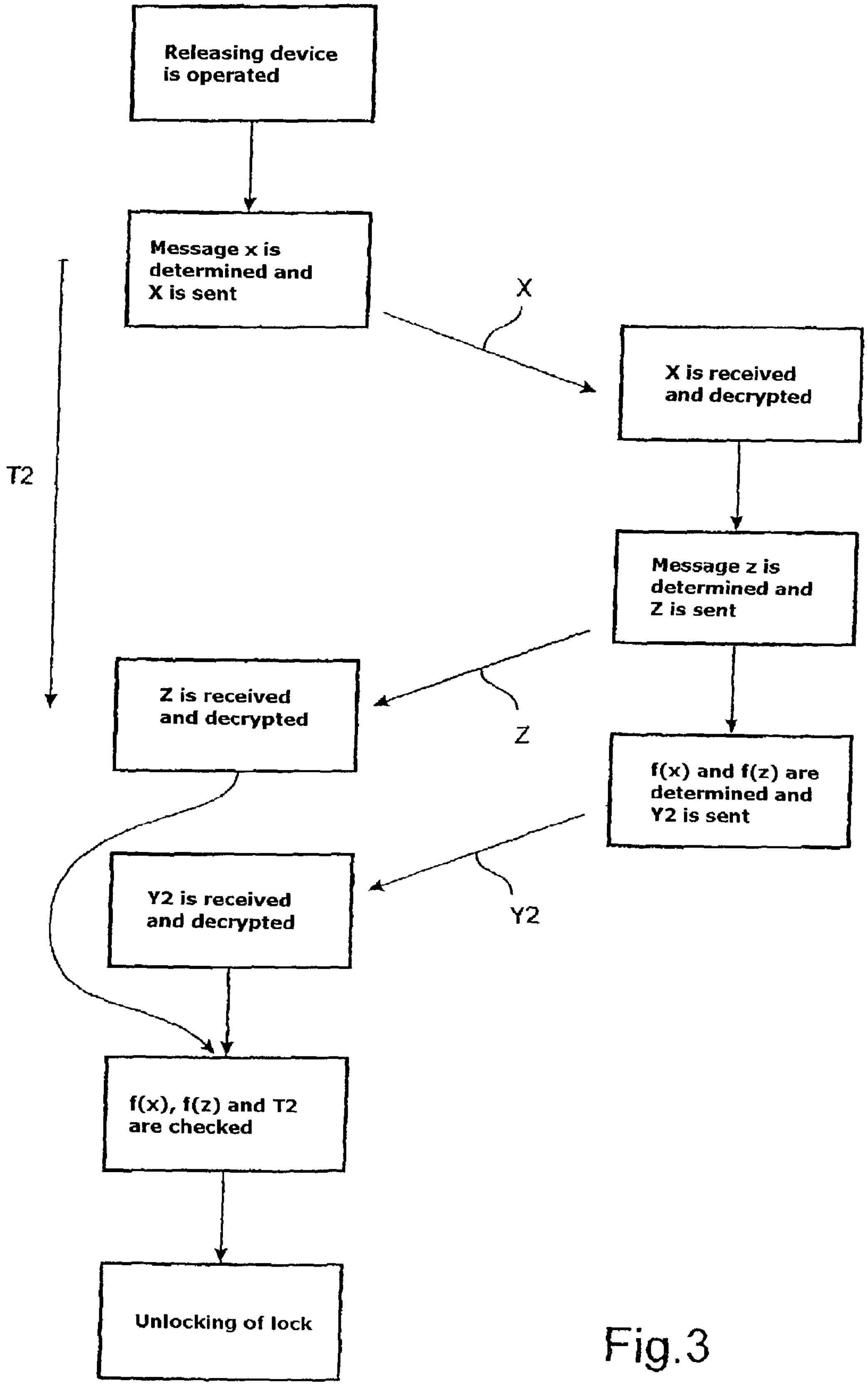

FIG. 3 illustrates a second exemplary embodiment of the signaling method between the vehicle 1 and the portable unit 2, which is a further development of the first embodiment.

According to this second embodiment, two second signals Z, Y2, are sent from the portable unit 2 to the object 1 in response to the signal X. A first Z of these second encrypted signals comprises second verification information z. The control unit 70 creates namely a message that consists of identity information E_ID that is unique to the unit 2 and a random number E_RND. The second signal Y2 that is last in time comprises a first part f(x), as described above, and a second part f(z). In particular, f(z) comprises the message part E_VER=f (E_RND). A time T2 is measured by the control unit 7 of the object 1 from the transmission of the first signal X until the reception of the first in time Z of the second signals. When Y2 has been received and decrypted, f(x) (=E_SVAR), f (z) (=E_VER) and T2 are checked, after which the lock 11 is unlocked if E_SVAR=f(O_RND), E_VER=f (E_RND) and the measured time is less than a predetermined value.

The processing of the first and second information (x and z respectively) is carried out after the time measurement has been completed. Using a suitable signaling algorithm, the requisite time from the reception of the first signal X until the transmission of the second signal Z can be predicted with high accuracy. For this, a signaling algorithm that is highly time-deterministic is required.

Figure 4:
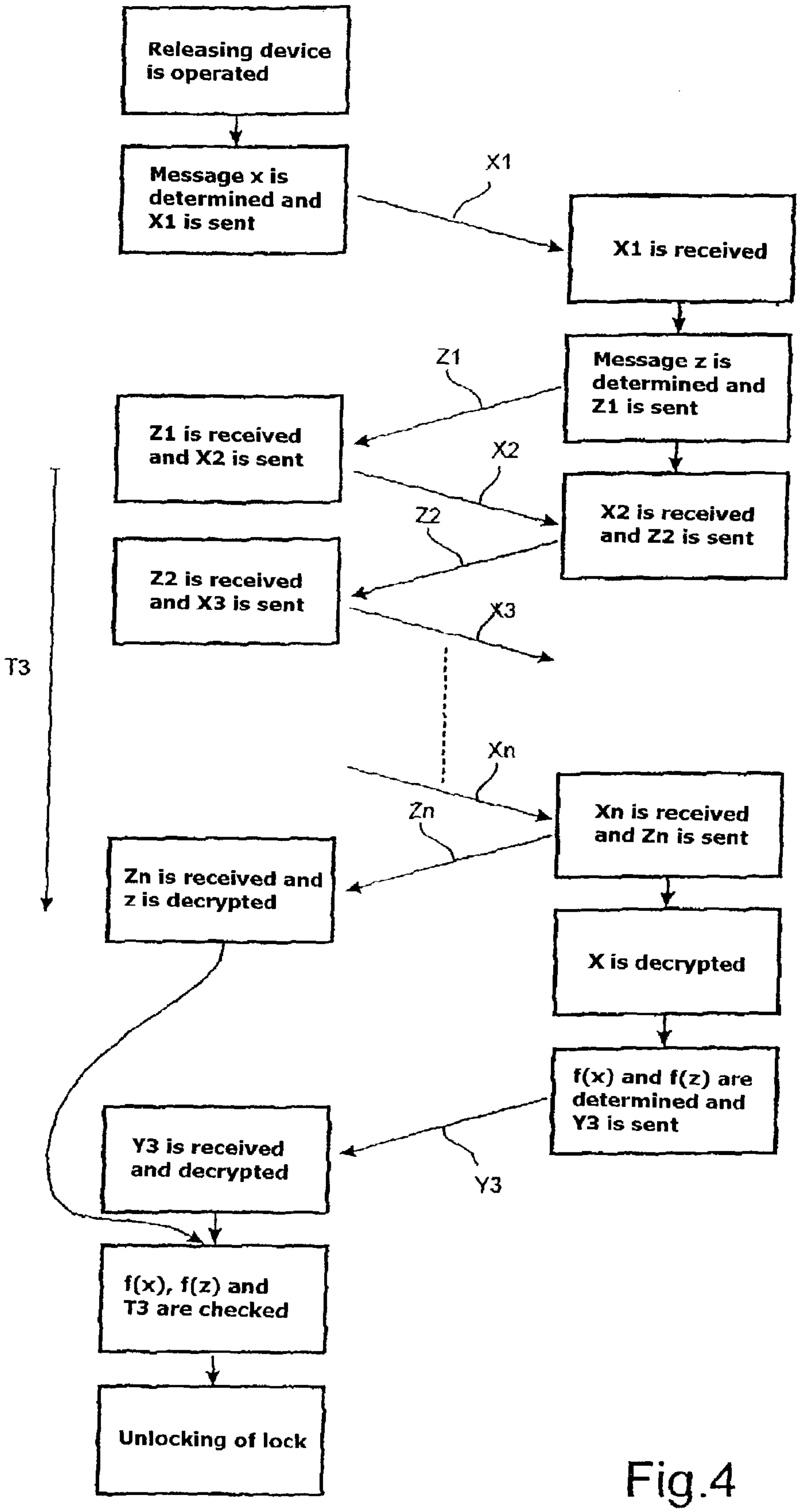

FIG. 4 illustrates a third exemplary embodiment of the signaling method between the vehicle 1 and the portable unit 2, which is a further development of the second embodiment.

A plurality of first signals Xi are sent from the object 1 to the portable unit 2 and a plurality of second signals Zi, Y3 are sent from the portable unit 2 to the object 1. The first information x described above is encrypted and the result is divided up into a plurality of parts, which are sent in the first signals Xi. The second information z described above is encrypted and the result divided up in the same way into a plurality of parts, which are sent in the second signals Zi. The signals X2 . . . Xn and Z1 . . . Zn are sent in series and in such a way that every second signal consists of one of the first signals and every second signal consists of one of the second signals. A time T3 is measured by the control unit 7 of the object 1 from the transmission of the second in time X2 of the first signals until the reception of the last second signal Zn with the second verification information. When all the signals X2-Xn and Z1-Zn have been received, the information x and z respectively can be obtained.

The last in time second signal Y3 is thereafter produced in the same way as the above described Y2.

As an alternative to the first information x being first encrypted and the result thereafter being divided up, the information can first be divided up into the plurality of parts, after which each of the parts is encrypted. In the same way, the second information can, of course, first be divided up into the plurality of parts, after which each of the parts is encrypted.

The components of the portable unit 2 used for the signal communication are, for example, arranged in a passive state until the tripping device 3 is actuated. When the receiver of the portable unit receives the signal X1 from the object following the actuation of the tripping device, the components change to an active state. The content z in the second signals from the portable unit 2 used for the time measurement is now determined. Thereafter, the second signal Z1 is sent back to the object. Because the time is measured from the transmission of the second in time X2 of the first signals, the changeover from passive state to active state is not included in the time measurement. This means that the time measurement is carried out during a part of the signal communication, the time from the reception of a signal until the transmission of a subsequent signal in both the object and the portable unit being able to be predicted with high accuracy.

The total time for the part of the signal transmission that is utilized for the time measurement can thereby also largely be predicted. By this means, good conditions are created for eliminating the risk that the attempted unauthorized access to the vehicle described above will succeed.

As the signals are sent in series, any time deviation that occurs for the signal time forward and backward between the vehicle and the portable unit is totaled. Such a time deviation corresponds to the portable unit, and hence the user, being located at a distance greater than a maximal permitted distance from the vehicle. Because of the totaling, it is possible to determine more reliably whether the owner of the portable unit is located in the vicinity of the vehicle. The more signals that are used for the time measurement, the more secure the method. The number of signals from the unit that are included in the time measurement is at least one, preferably at least two, suitably at least ten and in particular at least one-hundred. The number of signals that is used depends on how high of security is desired/required for the authorization control.

The whole message, and hence the content in each of the signals Xi, from the vehicle is determined when the tripping device is actuated. In a corresponding way, the whole message, and hence the content in each of the signals Zi, from the unit, is determined when the unit receives the first signal X from the vehicle. By this means, the signaling method during the subsequent time measurement, that is the reception of a signal and transmission of the next signal from both the vehicle and the unit, will only consist of a number of well-defined operations. The time required for this method can thereby be predicted with high accuracy.

When the control unit 70 of the portable unit 2 has sent the last signal with the identity information part to the vehicle, it decrypts the total message from the vehicle using its encryption key. The decrypted message x has two parts, namely O_ID and O_RND. The portable unit 2 thereafter sends the last signal Y3 to the vehicle with information that it has received the whole message and succeeded in decrypting it, which is verified by the number O_RND being included in the signal. More specifically, the message part is created E_SVAR=f(O_RND). The last signal Y3 from the portable unit also comprises the message part E_RND. More specifically, E_VER=f(E_RND) is created for the last mentioned message part.

When the control unit 7 of the vehicle 1 has received for the time measurement the last Zn of the second signals with the identity information part from the portable unit 2, it decrypts the message using its encryption key. The decrypted message f(z) has two parts, namely E_ID and E_RND. Authorization is confirmed after the control unit 7 of the vehicle 1 has received the last signal Y3 from the portable unit 2, provided that:

E_ID is an approved key,

E_SVAR=f(O_RND),

E_VER=f(E_RND), and the measured time is less than or equal to a predetermined value that corresponds to a maximal permitted distance between the portable unit and the object.

Figure 5:
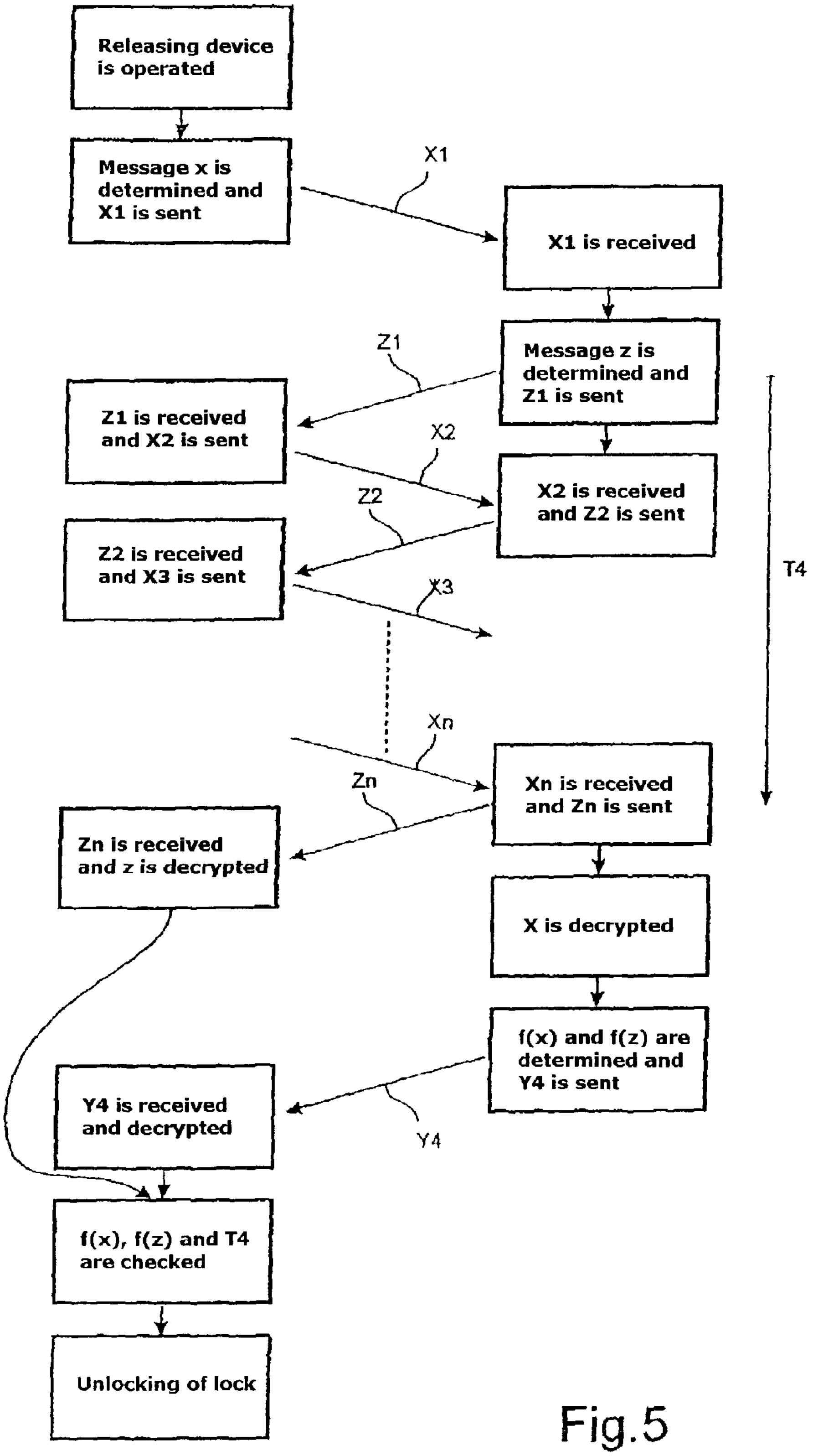

FIG. 5 illustrates a fourth embodiment of the signaling method between the vehicle 1 and the portable unit 2, which is a variant of the third embodiment and differs from this in that a signal transmission time T4 is measured by the control unit 70 of the unit 2. A signal Y4 also comprises a result of this time measurement, in addition to the information in the signal Y3.

Both the control unit 7 of the object 1 and the control unit 70 of the portable unit 2 comprise a memory, which in turn comprises a computer program product with program segments or a program code, for carrying out all the steps according to any one of the embodiments described above when the program is executed. The computer program product can be transmitted to the object or the portable unit in various ways via a propagating signal, for example via downloading from another computer, via cable and/or wireless means, or by the installation of a memory circuit. In particular, the propagating signal can be transmitted via the Internet. The term computer unit that is used in the claims refers to the control unit.

When the authorization is confirmed, an unlocking signal is sent from the vehicle's control unit to a lock on a door of the vehicle, which is thereby automatically unlocked.

The predetermined time value that corresponds to a maximal permitted distance between the portable unit and the object depends, of course, on the number of signals that are included in the time measurement.

It should be appreciated that the embodiments described herein are to be regarded only as exemplary and preferred examples of the present invention, and a number of further variants and modifications are possible within the scope of the following claims. For example, the portable unit can be programmed to determine the information in the message in its entirety before it receives the first signal from the object.

The invention is in particular intended for electromagnetic waves in the form of radio waves or microwaves. The frequency range or frequency ranges of the waves are preferably selected within a range where they are not subject to inference from other strong signals.

It is, of course, within the scope of the following claims to send signals without identity information between, before and/or after the signals with the identity information during the time measurement.

The number of signals that are to be sent from the portable unit for the identity control and/or the time measurement can be determined by the control unit 70.

It is also possible to vary the content in the signals used for the transmission of the identity information, while remaining within the scope of the claims.

The invention described above is not limited in any way to application in a vehicle, but could, for example, be used for controlling authorization for access to a stationary object, such as a building, a room or part of a building. The invention is similarly applicable to factory premises or an enclosed area, for example bounded by a fence, railings or the like. Nor is the invention restricted to the unlocking of a previously locked lock, but could of course also be used for locking a previously unlocked lock.

In addition, instead of a door handle, the tripping device 3 can also consist of an optical sensor, a sensor that detects heat, movement or pressure, radar or another type of sensor.

The invention claimed is:

1. A method for controlling access to an object, comprising the steps:

a) establishing signal communication via electromagnetic waves between the object and a wireless portable unit when a tripping device on the object is actuated, the signal communication comprising identity-based data-carrying signals sent from at least one of the object and the wireless portable unit and the identity-based data contained therein serving to identify the signal-sending device;

b) evaluating the distance between the object and the portable unit by measuring the total time for a plurality of said identity-based data-carrying signals to pass between the object and the portable unit;

c) evaluating at least one of said identity-based data-carrying signals to determine whether the identity-based data carried therein is correct; and d) authorizing access to the object if said total time is below a predetermined threshold and the identity-based data carried in said at least one evaluated signal is correct.

2. The method of claim 1, wherein said identity-based information-carrying signals include a signal (X) from the object that includes object identity data.

3. The method of claim 2, wherein said identity-based information-carrying signals include a signal (Y) from the portable unit that includes data that has been generated by algorithmically processing data included in said signal (X) from the object, said signal (Y) from the portable unit being evaluated in said step c) and the algorithmically generated data contained therein needing to be correct for access to the object to be authorized in said step d).

4. The method of claim 3, wherein said algorithmically generated data is obtained by processing a random number generated by the object and included in said signal (X) from the object.

5. The method of claim 2, wherein said identity-based information-carrying signals include a signal (Z) from the portable unit that includes portable unit identity data.

6. The method of claim 5, wherein said identity-based information-carrying signals include a signal (X) from the object that includes object identity data, said method further comprising sending a further signal (Y) from the portable unit to the object, which further signal (Y) includes data that has been generated by algorithmically processing data included in said signal (X) from the object, and evaluating said further signal (Y) to determine whether the algorithmically generated data included therein is correct.

7. The method of claim 6, wherein said further signal (Y) also includes data that has been generated by algorithmically processing a random number generated by the portable unit.

8. The method of claim 6, wherein access to the object is authorized if said total time is below a predetermined threshold, the identity-based data carried in said at least one evaluated signal is correct, and the algorithmically generated data included in said further signal (Y) is correct.

9. The method of claim 7, wherein access to the object is authorized if said total time is below a predetermined threshold, the identity-based data carried in said at least one evaluated signal is correct, and the algorithmically generated data included in said further signal (Y) is correct.

10. The method of claim 6, wherein the time for said further signal (Y) to be transmitted from the portable unit to the object is not used in measuring the total time in said step b).

11. The method of claim 1, wherein said identity-based data-carrying signals comprise signals carrying identity information in parsed form and said evaluating in said step c) is not performed until all parsed identity information-carrying signals have been sent and received.

12. The method of claim 11, wherein said identity information in parsed form includes object identity information ($x_2 \ldots x_n$) in parsed form.

13. The method of claim 11, wherein said identity information in parsed form includes portable unit identity information ($z_1 \ldots z_n$) in parsed form.

14. The method of claim 11, wherein said identity information in parsed form includes object identity information ($x_2 \ldots x_n$) in parsed form and portable unit identity information ($z_1 \ldots z_n$) in parsed form.

15. The method of claim 14, wherein the signals carrying said object identity information ($x_2 \ldots x_n$) in parsed form and the signals carrying said portable unit identity information ($z_1 \ldots z_n$) in parsed form are sent in alternating sequential fashion ($\ldots x_n, Z_n, X_{n+1}, Z_{n+1} \ldots$).

16. The method of claim 11, wherein the total time in said step b) includes the time for said signals carrying identity information in parsed form to pass between the object and the portable unit.

17. The method of claim 16, wherein the total time in said step b) includes only the time for said signals carrying identity information in parsed form to pass between the object and the portable unit.

18. The method of claim 11, further comprising sending a further signal (Y) from the portable unit to the object, which further signal (Y) includes data that has been generated by algorithmically processing data the portable unit has received from the object, and evaluating said further signal (Y) to determine whether the algorithmically generated data included therein is correct.

19. The method of claim 18, wherein said further signal (Y) includes data that has been generated by algorithmically processing a random number generated by the object.

20. The method of claim 19, wherein said further signal (Y) also includes data that has been generated by algorithmically processing a random number generated by the portable unit.

21. The method of claim 19, wherein access to the object is authorized if said total time is below a predetermined threshold, the identity-based data carried in said at least one evaluated signal is correct, and the algorithmically generated data included in said further signal (Y) is correct.

22. The method of claim 20, wherein access to the object is authorized if said total time is below a predetermined threshold, the identity-based data carried in said at least one evaluated signal is correct, and the algorithmically generated data included in said further signal (Y) is correct.

23. The method of claim 1, wherein measuring time commences upon an identity-based data-carrying signal being sent from the object to the portable unit.

24. The method of claim 23, wherein the signal upon which measuring time commences is the first signal in said signal communication.

25. The method of claim 23, wherein the signal upon which measuring time commences is a second or subsequent signal in said signal communication.

26. The method of claim 1, wherein measuring time commences upon an identity-based data-carrying signal being sent from the portable unit to the object, the signal upon which measuring time commences being a second or subsequent signal in said signal communication.

27. The method of claim 6, wherein said further signal (Y) is sent only after the measuring time in said step b) concludes.

28. The method of claim 18, wherein said further signal (Y) is sent only after the measuring time in said step b) concludes.

29. The method of claim 1, wherein the portable unit checks identity-based data received from the object.

30. The method of claim 29, wherein the portable unit only sends signals to the object if the identity-based data checked by the portable unit is approved by the portable unit.

31. The method of claim 1, wherein the identity-based data-carrying signals are encrypted.

* * * * *